US007521385B2

(12) United States Patent  
Ahluwalia

(10) Patent No.: US 7,521,385 B2  
(45) Date of Patent: *Apr. 21, 2009

(54) FIRE RESISTANT STRUCTURAL MATERIAL, FABRICS MADE THEREFROM

(76) Inventor: Younger Ahluwalia, 604 Regalwood Dr., Desoto, TX (US) 75115

( * ) Notice: Subject to any disclaimer, the term of this patent is extended or adjusted under 35 U.S.C. 154(b) by 68 days.

This patent is subject to a terminal disclaimer.

(21) Appl. No.: 10/354,219

(22) Filed: Jan. 29, 2003

(65) Prior Publication Data

US 2003/0176125 A1    Sep. 18, 2003

Related U.S. Application Data

(63) Continuation-in-part of application No. 09/955,395, filed on Sep. 18, 2001, now Pat. No. 6,858,550, and a continuation-in-part of application No. 09/663,255, filed on Sep. 15, 2000, now Pat. No. 6,586,353.

(60) Provisional application No. 60/352,691, filed on Jan. 29, 2002, provisional application No. 60/352,692, filed on Jan. 29, 2002, provisional application No. 60/352,693, filed on Jan. 29, 2002, provisional application No. 60/168,057, filed on Nov. 30, 1999.

(51) Int. Cl.
B32B 27/12     (2006.01)
B32B 27/04     (2006.01)
B32B 17/10     (2006.01)

(52) U.S. Cl. ............. 442/79; 442/97; 442/123; 442/136; 442/148; 442/180; 428/920; 428/921

(58) Field of Classification Search ............ 442/79, 442/97, 123, 136, 148, 180; 428/920, 921
See application file for complete search history.

(56) References Cited

U.S. PATENT DOCUMENTS

| 3,512,192 | A |   | 5/1970  | Simon |
| 3,921,358 | A |   | 11/1975 | Bettoli ..................... 52/314 |
| 4,162,342 | A |   | 7/1979  | Schwartz |
| 4,174,420 | A |   | 11/1979 | Anolick et al. |
| 4,229,329 | A |   | 10/1980 | Bennett |
| 4,495,238 | A |   | 1/1985  | Adiletta |
| 4,504,991 | A |   | 3/1985  | Klancnik |
| 4,717,614 | A |   | 1/1988  | Bondoc et al. ............ 428/143 |
| 4,745,032 | A |   | 5/1988  | Morrison |
| 4,746,565 | A |   | 5/1988  | Bafford et al. |
| 4,784,897 | A |   | 11/1988 | Brands et al. |
| D309,027  | S |   | 7/1990  | Noone et al. .............. D25/139 |
| 4,994,317 | A |   | 2/1991  | Dugan et al. |
| 5,001,005 | A |   | 3/1991  | Blanpied |
| 5,091,243 | A |   | 2/1992  | Tolbert et al. |
| 5,110,839 | A |   | 5/1992  | Chao ......................... 521/83 |
| 5,130,191 | A | * | 7/1992  | Pole .......................... 428/332 |
| 5,232,530 | A |   | 8/1993  | Malmquist et al. ........ 156/78 |
| 5,338,349 | A | * | 8/1994  | Farrar ...................... 106/18.12 |
| 5,369,929 | A |   | 12/1994 | Weaver et al. .............. 52/557 |
| D369,421  | S |   | 4/1996  | Kiik et al. ................. D25/139 |
| 5,540,980 | A |   | 7/1996  | Tolbert et al. |
| 5,611,186 | A |   | 3/1997  | Weaver ...................... 52/557 |
| 5,666,776 | A |   | 9/1997  | Weaver et al. .............. 52/557 |
| 5,717,012 | A |   | 2/1998  | Bondoc et al. |
| 5,965,257 | A |   | 10/1999 | Ahluwalia |
| 6,051,193 | A |   | 4/2000  | Langer et al. |
| 6,136,216 | A | * | 10/2000 | Fidler et al. ................. 252/62 |
| 6,145,265 | A |   | 11/2000 | Malarkey et al. ........... 52/555 |
| 6,207,738 | B1 |  | 3/2001  | Zuckerman et al. |
| 6,228,497 | B1 |  | 5/2001  | Dombeck |
| 6,289,648 | B1 |  | 9/2001  | Freshwater et al. ......... 52/557 |
| 6,341,462 | B2 |  | 1/2002  | Kiik et al. .................. 52/518 |
| 6,365,533 | B1 |  | 4/2002  | Horner et al. |
| 6,397,546 | B1 |  | 6/2002  | Malarkey et al. ........... 52/555 |
| 6,500,560 | B1 |  | 12/2002 | Kiik et al. |
| 6,514,362 | B1 |  | 2/2003  | Zuckerman et al. |
| 6,586,353 | B1 |  | 7/2003  | Kiik et al. .................. 442/320 |
| 6,673,432 | B2 |  | 1/2004  | Kiik et al. ................. 428/301.1 |
| 6,708,456 | B2 |  | 3/2004  | Kiik et al. .................... 52/98 |

FOREIGN PATENT DOCUMENTS

| CA | 1073600  | 3/1980  |
| DE | 19729533 | 1/1999  |
| EP | 0388338  | 9/1990  |
| EP | 0391000  | 10/1990 |
| GB | 923749   | 5/1963  |
| GB | 1228592  | 4/1971  |

(Continued)

OTHER PUBLICATIONS

U.S. Appl. No. US2003/0054717, published Mar. 20, 2003.
U.S. Appl. No. US2003/0040241, published Feb. 27, 2003.
U.S. Appl. No. US2003/0032356, published Feb. 13, 2003.
U.S. Appl. No. US2002/0193028, published Dec. 19, 2002.
U.S. Appl. No. US2002/0160210, published Oct. 31, 2002.
U.S. Appl. No. US2001/0000517, published Apr. 26, 2001.
T.J. Ohlemiller et al., *Flammability Assessment Methodology for Mattresses*, NISTIR 6497, Jun. 2000.
State of California Department of Consumer Affairs Bureau of Home Furnishings and Thermal Insulation Technical Bulletin 129, Oct. 1992, *Flammability Test Procedure for Mattresses for use in Public Buildings* (California TB129).

(Continued)

*Primary Examiner*—Ula C Ruddock
(74) *Attorney, Agent, or Firm*—Baker Botts L.L.P.

(57) ABSTRACT

The present invention relates to a fire resistant structural material comprising a surfactant component, surfactant-generated microcells, a gel catalyst component and a binder component. The structural material may further comprise a filler component. In addition, the present invention relates to fire resistant fabric materials comprising a substrate coated with a coating comprising the fire resistant structural material. Further, the present invention relates to fire resistant articles of manufacture comprising the fire resistant fabric material, and particularly to mattresses comprising the fire resistant fabric material.

13 Claims, 3 Drawing Sheets

FOREIGN PATENT DOCUMENTS

| | | |
|---|---|---|
| GB | 2167060 | 5/1986 |
| WO | 9534609 | 12/1995 |
| WO | 9900338 | 1/1999 |
| WO | 0140568 | 6/2001 |
| WO | 0163986 | 8/2001 |
| WO | 0200425 | 1/2002 |
| WO | 0200427 | 1/2002 |
| WO | 0246550 | 6/2002 |
| WO | 03024881 | 3/2003 |

OTHER PUBLICATIONS

U.S. Appl. No. US 2003/0228460 by Ahluwalia, published Dec. 11, 2003.

U.S. Appl. No. US 2003/0224679 by Ahluwalia, published Dec. 4, 2003.

* cited by examiner

FIRE RESISTANT STRUCTURAL MATERIAL, FABRICS MADE THEREFROM

CROSS REFERENCE TO RELATED APPLICATIONS

This application is a continuation-in-part of U.S. application Ser. No. 09/663,255 filed on Sep. 15, 2000 now U.S. Pat. No. 6,586,353, which claims priority under 35 U.S.C. §119(e) to Provisional Application No. 60/168,057, filed Nov. 30, 1999; and this application is also a continuation-in-part of U.S. application Ser. No. 09/955,395 filed on Sep. 18, 2001 now U.S. Pat. No. 6,858,550; and this application also claims priority under 35 U.S.C. §119(e) to Provisional Application Nos. 60/352,691, 60/352,692, and 60/352,693, which were all filed on Jan. 29, 2002.

FIELD OF THE INVENTION

This invention relates to fire resistant structural materials and fire resistant fabric materials made therefrom and more particularly to such materials which may be adhered to decorative fabrics to provide fire resistant decorative fabrics especially suitable for use in mattresses, draperies, furniture upholstery and the like. Accordingly, the invention further relates to fabric materials comprising a substrate coated with a coating comprising the structural material of the present invention. The fabric materials are fire resistant.

BACKGROUND OF THE INVENTION

Various attempts have been made to produce fire resistant fabrics having characteristics that make them suitable for use in mattresses and in other applications, e.g., draperies and upholstery.

U.S. Pat. No. 5,540,980 is directed to a fire resistant fabric useful for mattress ticking. The fabric is formed from a corespun yarn comprising a high temperature resistant continuous filament fiberglass core and a low temperature resistant staple fiber sheath which surrounds the core. The fiberglass core comprises about 20% to 40% of the total weight of the corespun yarn while the sheath comprises about 80% to about 60% of the total weight of the corespun yarn. The corespun yarn can be woven or knit to form fabric with fire resistant characteristics. When exposed to a flame, the sheath chars and the fiberglass core serves as a fire barrier. In a preferred embodiment, the sheath is made from cotton.

U.S. Pat. No. 5,091,243 discloses a fire barrier fabric comprising a substrate formed of corespun yarns and a coating carried by one surface of the substrate. Other fire resistant fabrics include Fenix™ (Milliken, LaGrange, Ga.) and fabrics made by Freudenberg (Lowell, Mass.), Ventex Inc. (Great Falls, Va.), BASF, Basofil Fiber Division (Enka, N.C.), Carpenter Co. (Richmond, Va.), Leggetand Platt (Nashville, Tenn.), Chiquala Industries Products Group (Kingspoint, Tenn.), and Sandel (Amsterdam, N.Y.). DuPont also manufacturers a fabric made from Kevlar™ thread. In addition, the mattress industry has attempted to manufacture mattresses by using Kevlar™ thread, glass thread, flame retardant polyurethane foams, flame retardant ticking, flame retardant cotton cushioning and flame retardant tape. However, use of these materials may add to the cost of mattresses and may result in a cost-prohibitive product. Additionally, some fire-resistant threads, such as glass threads, are difficult to work with and can break, adding to the time required for manufacturing the mattress, which also translates into added costs.

Flame retardant tapes are also difficult to work with and increase production time. In addition, flame retardant tapes are only available in a limited number of colors and sizes. Flame retardant polyurethanes may release noxious gases when they smolder and ignite. Furthermore, the process for flame retarding ticking often compromises the desired characteristics of the ticking (e.g. it may no longer be soft, drapable, pliable, flexible, etc).

For many years substrates such as fiberglass have been coated with various compositions to produce materials having utility in, among other applications, the building industry. U.S. Pat. No. 5,001,005 relates to structural laminates made with facing sheets. The laminates described in that patent include thermosetting plastic foam and have planar facing sheets comprising 60% to 90% by weight glass fibers (exclusive of glass micro-fibers), 10% to 40% by weight non-glass filler material and 1% to 30% by weight non-asphaltic binder material. The filler materials are indicated as being clay, mica, talc, limestone (calcium carbonate), gypsum (calcium sulfate), aluminum trihydrate (ATH), antimony trioxide, cellulose fibers, plastic polymer fibers or a combination of any two or more of those substances. The patent further notes that the filler materials are bonded to the glass fibers using binders such as urea-, phenol- or melamine-formaldehyde resins (UF, PF, and MF resins), or a modified acrylic or polyester resin. Ordinary polymer latexes used according to the disclosure are Styrene-Butadiene-Rubber (SBR), Ethylene-Vinyl-Chloride (EVCl), PolyVinylidene Chloride (PvdC), modified PolyVinyl Chloride (PVC), PolyVinyl Alcohol (PVOH), and Poly-Vinyl Acetate (PVA). The glass fibers, non-glass filler material and non-asphaltic binder are all mixed together to form the facer sheets.

U.S. Pat. No. 4,745,032 discloses an acrylic coating comprised of one acrylic underlying resin which includes fly ash and an overlying acrylic resin which differs from the underlying resin.

U.S. Pat. No. 4,229,329 discloses a fire retardant coating composition comprising fly ash and vinyl acrylic polymer emulsion. The fly ash is 24 to 50% of the composition. The composition may also preferably contain one or more of a dispersant, a defoamer, a plasticizer, a thickener, a drying agent, a preservative, a fungicide and an ingredient to control the pH of the composition and thereby inhibit corrosion of any metal surface to which the composition is applied.

U.S. Pat. No. 4,784,897 discloses a cover layer material on a basis of a matting or fabric which is especially for the production of gypsum boards and polyurethane hard foam boards. The cover layer material has a coating on one side which comprises 70% to 94% powdered inorganic material, such as calcium carbonate, and 6% to 30% binder. In addition, thickening agents and cross-linking agents are added and a high density matting is used.

U.S. Pat. No. 4,495,238 discloses a fire resistant thermal insulating composite structure comprised of a mixture of from about 50% to 94% by weight of inorganic microfibers, particularly glass, and about 50% to 6% by weight of heat resistant binding agent.

U.S. Pat. No. 5,965,257, issued to the present assignee, the entire disclosure of which is incorporated herein by reference, discloses a structural article having a coating which includes only two major constituents, while eliminating the need for viscosity modifiers, for stabilizers or for blowing. The structural article of U.S. Pat. No. 5,965,257 is made by coating a substrate having an ionic charge with a coating having essentially the same iconic charge. The coating consists essentially of a filler material and a binder material. The assignee, Elk Corporation of Dallas, produces a product in accordance with the invention of U.S. Pat. No. 5,965,257 which is marketed as VersaShield®.

As indicated in U.S. Pat. No. 5,965,257, VersaShield® has many uses. However, it has been found that the products made in accordance with U.S. Pat. No. 5,965,257 are not satisfactory for certain uses because they lack sufficient drapability.

U.S. patent application Ser. No. 09/955,395, filed Sep. 18, 2001, the entire disclosure of which is incorporated herein by reference, addresses these inadequacies with a fire resistant fabric material comprising a substrate having an ionic charge coated with a coating having essentially the same ionic charge wherein the coating comprises a filler component which includes clay and a binder component. A fire resistant fabric material thus produced has satisfactory flexibility, pliability and drapability characteristics. However, while this material is suitable as a fire resistant fabric material, it is desirable to provide a fire resistant material that would also have cushioning or "bounceback" characteristics.

SUMMARY OF THE INVENTION

The present invention relates to a structural material comprising a surfactant component, surfactant-generated microcells, a gel catalyst component and a binder component. The structural material may further comprise a filler component. The structural material is fire resistant and is useful, inter alia, for making fire resistant fabric materials which comprise a substrate coated with a coating comprising the structural materials of the present invention. The substrate may be planar and may have one or both sides coated with the structural materials. Moreover, the fabric material may further include a water repellent material, an antifungal material, an antibacterial material, a surface friction agent, a flame retardant material and/or an algaecide. Further, the fabric material may be colored with dye.

The present invention also relates to a mattress fabric comprising a decorative fabric and a fabric material comprising a substrate coated with the structural materials of the present invention. Further, the present invention relates to a mattress comprising a decorative fabric and a fabric material comprising a substrate coated with the structural materials of the present invention.

In a particularly preferred embodiment, the coating does not bleed through the substrate during the material making process. The substrate may be any suitable reinforcement material capable of withstanding processing temperatures and is preferably woven fiberglass.

The structural material of the present invention may be used as a standalone product, for example, as a fire resistant foam material, or it may also be used in conjunction with (e.g. as a liner for) a decorative fabric which may itself be fire resistant. The present invention also relates to an article of manufacture comprising the inventive structural material and/or the inventive fire resistant fabric materials and includes, inter alia, mattress fabrics, mattress covers, mattresses, upholstered articles, building materials, bedroom articles, (including children's bedroom articles), draperies, carpets, tents, awnings, fire shelters, sleeping bags, ironing board covers, barbecue grill covers, fire resistant gloves, airplane seats, engine liners, and fire-resistant clothing for race car drivers, fire fighters, jet fighter pilots, and the like. The use of the fire resistant materials and fire resistant fabric materials of the present invention for manufacturing fabrics for use in articles such as mattresses, cribs, draperies and upholstered furniture, may enable the article to exceed current flammability standards for these types of articles.

BRIEF DESCRIPTION OF THE FIGURES

The present invention may be better understood with reference to the attached figures in which—

DETAILED DESCRIPTION

Figure 1:
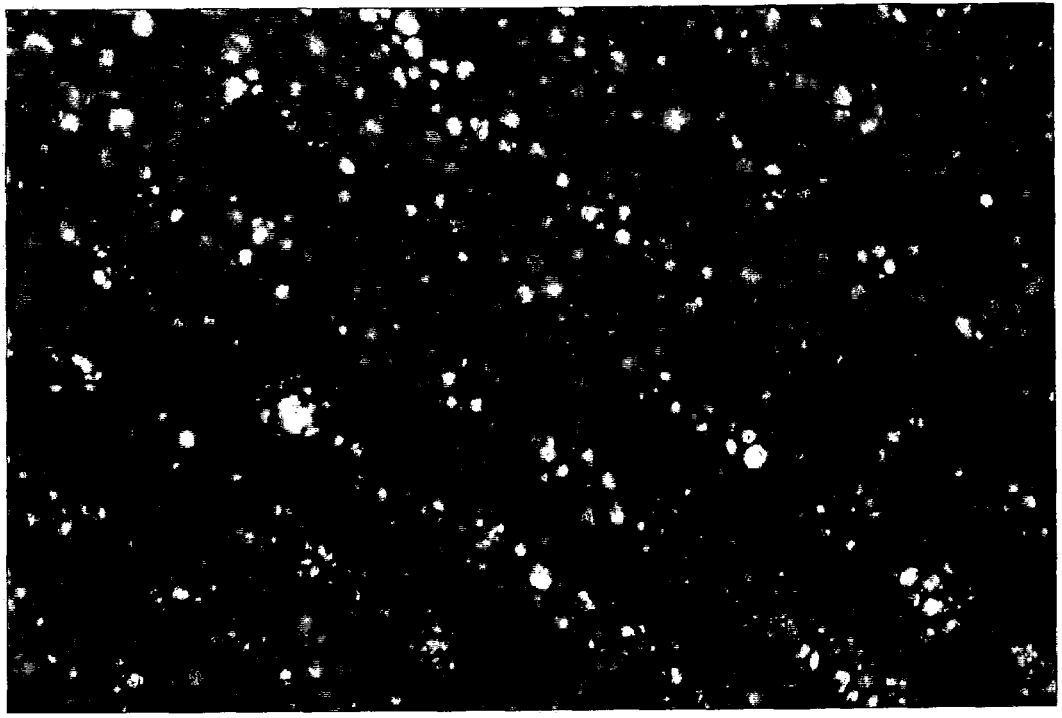
FIG. 1 is a photograph showing the surfactant-generated microcells of an exemplary embodiment of a fire resistant fabric material made in accordance with the present invention which does not include a filler component.

The structural material of the invention comprises a surfactant component, surfactant-generated microcells, a gel catalyst component and a binder component. The structural material may further comprise a filler component. As used herein, surfactant-generated microcells are essentially voids or hollow spheres which are formed by the presence of a surfactant during the fire resistant material making process. The surfactant component of the present invention is capable of forming such microcells. The surfactant-generated microcells impart various characteristics to the fabric materials of the present invention, including, inter alia, improved fire resistance, flexibility, pliability, drapability, and "bounce back". The gel catalyst component may further enhance any and all of these characteristics.

In accordance with the invention, a fabric material is made by coating a substrate with a coating comprising the aforementioned structural material. In a preferred embodiment, the coating does not bleed through the substrate during the material making process.

The structural material of the present invention is prepared by using a binder component such as a high performance heat-reactive acrylic latex polymer and/or a non-heat reactive styrene butadiene latex to bond the filler materials together. Where the structural material is used to coat a substrate, the binder component acts to bond the filler to the substrate. In one embodiment of the invention, the binder component is Rhoplex 3349 (available from Rohm and Haas, Philadelphia, Pa.) and/or Rovene 4402 (Mallard Creek Polymers, Charlotte, N.C.). Additional or alternative binders include, inter alia, Hycar™ 26469, Hycar™ 26472, Hycar™ 26484, Hycar™ 26497, Hycar™ 264552, Hycar™ 264512, Hycar™ 264582, Hycar™ 26083 (low formaldehyde), Hycar™ 9201 (low formaldehyde), Hycar™ 1552 (nitrile), Hycar™ 1571 (nitrile), Vycar™ 552, Hycar™ 2679 acrylic latex polymer (all Hycar™ and Vycar™ products are supplied by B. F. Goodrich Company of Cleveland, Ohio. Binder components may also include Cymel™ 373 (available from American Cyanamid), RHOPLEX™ TR 407 and R&H GL-618 latex both available from Rohm & Haas, and Borden FG-413F UF resin (available from Borden). It is believed, however, that any linear polymer, linear copolymer or branched polymer may be useful in preparing the coating, such as those available from BASF and Goodyear Further possible binder materials include butyl rubber latex, SBR latex, neoprene latex, polyvinyl alcohol emulsion, SBS latex, water based polyurethane emulsions and elastomers, vinyl chloride copolymers, nitrile rubbers and polyvinyl acetate copolymers. In a preferred embodiment, an SBR latex is used. SBR latex adds good softness characteristics but is not a flame retardant. To improve fire resistance, an acrylic latex may be added or substituted. The more acrylic latex, the better the fire resistance of the material. However, softness is decreased as the SBR latex is substituted. In a particularly preferred embodiment, the binder component comprises Rhoplex 3349 and Rovene 4402.

The surfactant component of the present invention may be any surfactant capable of forming microcells during the structural material making process. In a preferred embodiment, the surfactant component comprises a fast soap, such as ammonium lauryl sulfate (ALS) (e.g. Stepanol AM; Stepan Chemicals, Northfield, Ill.) and sodium lauryl sulfate (SLS). Generally, a "fast soap" is a soap which is capable of efficiently modifying the surface tension of a solvent, such as water. However, other surfactants may also be used which are not characterized as fast soaps but which are capable of forming microcells. Fast soaps, such as ALS, form microcells that are resilient and are generally stable to the heat of processing. Surfactant-generated microcells are generally not stable at temperatures above 350° F. Additional components may be added to further stabilize the microcells, as further discussed below. However, if so desired, a surfactant which forms "weak" microcells may be used. The "weak" microcells may burst during processing to produce a less flexible fire resistant material.

The gel catalyst component of the present invention may be any component known in the art which is capable of catalyzing gel formation. In a preferred embodiment, the gel catalyst is SSF-GEL available from Parachem (Dalton, Ga.). In addition, other catalysts may be added to promote vulcanization to provide permanent cross-linking and to thermoset the material which can enhance the strength of the surfactant-generated microcell structure. In a preferred embodiment of the present invention, UP-750 (a sulfur catalyst available from Tiarco, Dalton, Ga.) is such a catalyst. In addition, Octocureg®-590, Octocure®-456 and Octocure®-462 (available from Tiarco, Dalton, Ga.) may also be used for this purpose.

The gel catalyst may catalyze gel formation very quickly. In order to control gel formation catalyzation, very small amounts of gel catalyst may be added by, for example, diluting the gel catalyst and adding a small volume of diluted gel catalyst. Since gel formation may occur very quickly upon addition of gel catalyst, the binder component and surfactant component may be mixed together first and surfactant-generated microcells may be introduced to that mixture by any method known in the art, such as by using a roamer, then the gel catalyst may be added in order to ensure gel formation does not occur prior to surfactant-generated microcell formation.

As noted, surfactant-generated microcells may be created by any means known in the art, such as, but not limited to, blowing air into the mixture, agitation or by a roamer. Surfactant-generated microcells may also be introduced using chemical blowing agents, such as azo compounds which release nitrogen gas.

In one embodiment of the invention, the binder/surfactant mixture is subjected to a roamer. The roamer acts to inject air into the mixture so that the surfactant forms microcells within the mixture. The foamer may comprise a tube-like component having a multitude of pins which are capable of rotating in opposing directions (e.g. some pins move clockwise and some move counterclockwise). The mixture of binder and surfactant is added to the foamer through a port on one side and, as it passes through the roamer, the pins rotate causing the introduction of air and the creation of surfactant-generated microcells. Additional air may also be introduced into the roamer at another port to further enhance surfactant-generated microcell formation. After surfactant-microcell generation, the gel catalyst may be added through a port of the foamer. The mixture may then be spread onto a substrate, such as a fiberglass mat. Alternatively, if no substrate is desired, the mixture may be spread onto a receiving platform, such as a steel tray to form a free-standing sheet. Whether applied to a substrate or a receiving platform, the material is then subjected to heat in an oven. Processing temperatures are preferably between about 280° F. to about 350° F. The heat of processing further enhances gel formation by causing the reaction to occur at a faster rate.

Figure 2:
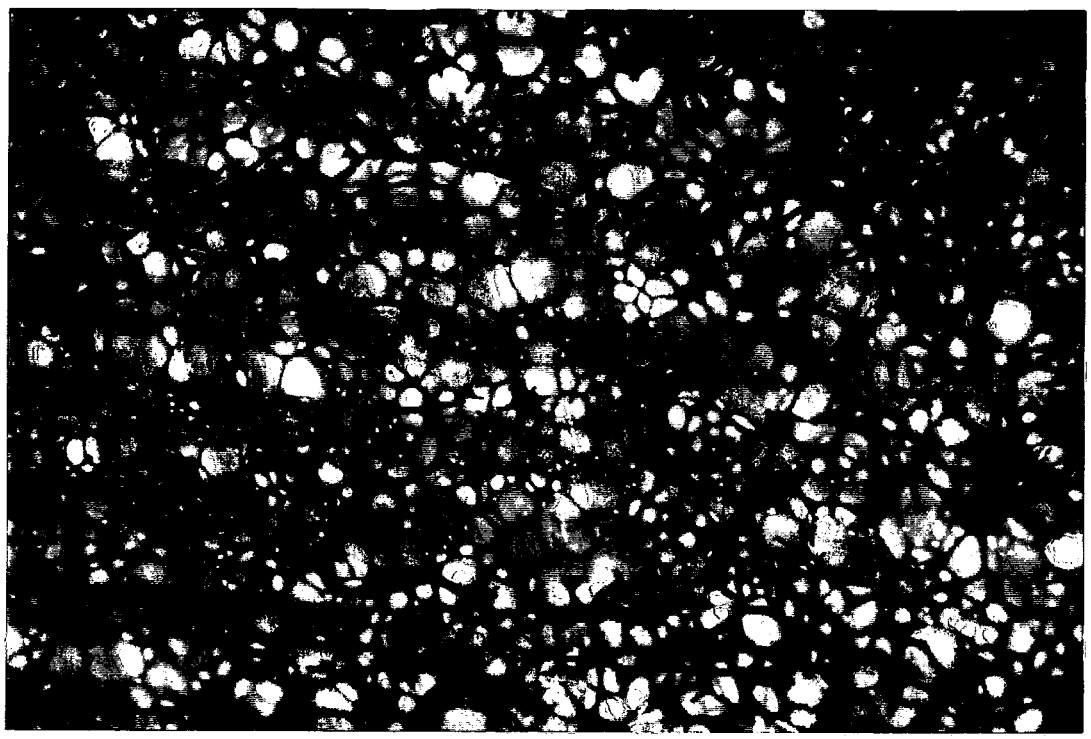
FIG. 2 is a photograph showing the surfactant-generated microcells of another exemplary embodiment made in accordance with the present invention which further comprises a filler component.

In a preferred embodiment, the surfactant-generated microcells are stable to the heat of processing. As noted, generally surfactant-generated micrcocells are not stable at temperatures above 350° F. FIG. 1 shows surfactant-generated microcells for one embodiment of the invention. In this embodiment, no filler component has been added. FIG. 2 shows surfactant-generated microcell formation in another exemplary embodiment of the present invention wherein a filler component has been included. The filler is added to the mixture together with the surfactant and binder and before the addition of the gel catalyst. As shown in FIGS. 1 & 2, the surfactant-generated microcells are relatively small and uniform in size.

In another embodiment, the structural material also includes a surfactant capable of regulating surfactant-generated microcell formation which is added prior to the addition of the gel catalyst. One such surfactant is Stanfex 320, (Parachem, Dalton, Ga.). The surfactant capable of regulating surfactant-generated microcell formation can ensure that the microcells remain within a preferred size range (e.g. do not get too big) and form in a relatively monodisperse state (i.e., are of the same general size). In a preferred embodiment, the surfactant-generated microcells are about 5.0μ to about 20.0μ in diameter. In addition, citric acid may be used to ensure that the surfactant-generated microcells are spread out uniformly.

It may also be desirable for the fire resistant materials to include a dispersant which acts to keep the mixture comprising the binder, surfactant and gel catalyst well dispersed during the material making process. Examples of such dispersants include, inter alia, TSPP, Accuma 9300, Accuma 9400 and Accuma 9000 (all available from Rohm & Haas).

The fire resistant fabric materials of the present invention are flexible, pliable and have good drapability characteristics. In addition they are durable and preferably do not crack upon bending. Durability of the fire resistant material may be enhanced by adding components capable of stabilizing the surfactant-generated microcells. Such components include surfactants such as ammonium stearate (Parachem, Dalton, Ga.), octosol A18 (Tiarco Chemicals, Dalton, Ga.), A-1 (disodium n-alkylsulfosuccinate; Tiarco Chemicals), 449 (potassium oleate, Tiarco Chemicals), and Stanfex 320. The surfactant-generated microcell may be stabilized by making the wall of the microcell thicker. A surfactant which comprises a long waxy chain may be particularly useful for stabilizing the microcells.

The structural material may further include a cross-linking component, such as melamine (Borden Chemicals, Morganton, N.C.) and/or ammonium chloride. The cross-linking component is useful to improve durability and surfactant-generated microcell structural strength. In order to control the amount and rate of cross-linking, it may be desired to control the pH of the mixed components. For example, in acidic conditions (pH~4.0), the cross-linking will occur very quickly and the mixture will have a short pot-life. At higher pH (~10.0), the cross-linking proceeds more slowly and may be controlled by heat. The cross-linking component may increase the rate at which gel formation occurs and allow for gel formation to occur at a lower temperature. In addition, the cross-linking component may improve the strength of the material.

The structural material of the present invention may also comprise resin which may provide a polymer shell to encapsulate air. In one embodiment, the resin is DPG-38, available from Parachem of Dalton, Ga.

The structural materials of the present invention have "bounceback" characteristics due to gel formation. In one embodiment, the "bounceback" characteristics may be further enhanced through the use of additional components. As used herein, "bounceback" refers to the ability of the material to return to its original shape after having been distorted, such as stretched or compressed. The additional components may coat the inside of the microcell such that the microcell reverts to its original shape after having been distorted. Preferred components useful for achieving bounceback characteristics include CT101 (silicon oil; Kelman Industries, Duncan, S.C.), Freepel 1225 (BF Goodrich, Cleveland, Ohio), Sequapel 409 (Omnovasolutions, Inc. of Chester, S.C.), Michem emulsion 41740 (available from Michelman, Inc. of Cincinnati, Ohio), Syloff-1171A (available from Dow Corning, Corporation of Midland, Mich.), Syloff-62 (Dow Corning), Syloff-7910 (Dow Corning) and Aurapel 391 (available from Sybron/Tanatex of Norwich, Conn.). These components also ensure that the microcells do not aggregate and form clumps of microcells.

As noted, the structural materials of the present invention comprising a binder component, a surfactant component and a gel catalyst component may further comprise a filler component. The filler component of the present invention preferably includes clay. The clay is preferably China clay which is very soft and light. In addition, the clay may be Paragon™, which is a soft clay (i.e. it is soft to the touch), Suprex™, which is a hard clay (i.e. it is hard to the touch), Suprex™ amino silane treated clay, which is used for crosslinking, because it will chemically bond with binder, and for highloading, Ballclay™, which has elastic properties (i.e. it feels rubbery), Texwhite 185 (available from Huber, Dry Branch, Ga.), and ECC 1201 (available from Huber). All of above-listed clay products, unless otherwise noted, are available, for example, from Kentucky-Tennessee Clay Company of Langley, S.C. In one embodiment, the clay is Ballclay™ 3380 which is particularly inexpensive compared to other clays. In a preferred embodiment, the clay is Kaolin clay which is a lower grade China clay. In particularly preferred embodiments, the clay is Texwhite 185 and/or ECC 1201.

In the present invention, clay is a preferred filler because of its elongation properties (it has a low modulus), its abrasion resistance, its tear resistance, and its tensile strength. Moreover, clay is a good heat barrier; it does not disintegrate when an open flame (temperature $\geqq 1500°$ F.) is applied directly to a coating of the present invention that includes clay. In addition, clay provides a slick, elastic, glassy surface which exhibits flexibility. Furthermore, as noted, clay is inexpensive and thus can provide a low cost fabric material.

The filler material may alternatively or additionally comprise a filler selected from the group consisting of decabromodiphenyloxide, antimony trioxide, calcium carbonate, charged calcium carbonate, titanium dioxide, fly ash (such as Alsil O4TR™ class F fly ash produced by JTM Industries, Inc. of Martin Lake and Jewett, Tex. which has a particle size such that less than 0.03% remains on an agitated 0.1 inch×0.1 inch screen), 3-X mineralite mica (available from Engelhard, Inc. of Louisville, Ky.) and glass or ceramic microspheres (glass microspheres are 2.5 times lighter than ceramic microspheres and also provide fire resistance), or any mixture of these filler materials to meet desired cost and weight criteria. Glass and ceramic microspheres are manufactured by Zeelan Industries of 3M Center Bldg., 220-8E-04, St. Paul, Minn. 55144-1000. Calcium carbonate may be obtained from Franklin Industrial Minerals of 612 Tenth Avenue North, Nashville, Tenn. 37203.

Calcium carbonate, talc and fly ash filler increase the weight of the product, but utilization of glass and/or ceramic microspheres enables the manufacture of a product with reduced weight and increased fire resistant properties. Clay may impart to the product the following nonlimiting characteristics: (1) lower heat build-up, (2) heat reflectance properties, (3) fire barrier properties, (4) no weight loss when exposed to heat and open flame, and (5) reduced disintegration when exposed to heat and open flame. Decabromodiphenyloxide and antimony trioxide impart the following nonlimiting characteristics: (1) flame retardant properties, (2) capability of forming a char, and (3) capability of stopping the spread of flames. It is believed that the gas produced from the heating of the decabromodiphenyloxide can also act as a flame retardant because the gas uses up oxygen or depletes oxygen in the layer next to the fabric and suppresses or stops the fire from further progression.

Glass and ceramic microspheres can withstand heat greater than 2000° F. Also, glass and ceramic microspheres increase compressive strength, absorb no latex and/or water and thus permit the faster drying of the product. Glass and ceramic microspheres also increase product flexibility.

Further, the glass and ceramic microspheres help to increase the pot life of the coating. Heavier particles in the fillers, although they may comprise but a small percentage of the particles in the filler, have a tendency to settle near the bottom of a storage vessel. When glass and/or ceramic microspheres are mixed together with another filler, a dispersion is produced which has an increased pot life or shelf life. Without wishing to be bound by any particular theory, it is believed that as the filler particles naturally fall in the vessel and the glass and ceramic microspheres rise, the smaller size filler particles are supported by the glass and/or ceramic microspheres, thus enabling the microspheres to stay in solution and preventing the filler particles, to at least some extent, from descending to the bottom of the vessel.

The substrate of the present invention may be any suitable reinforcement material capable of withstanding processing temperatures, such as glass fibers, polyester fibers, cellulosic fibers, asbestos, steel fibers, alumina fibers, ceramic fibers, nylon fibers, graphite fibers, wool fibers, boron fibers, carbon fibers, jute fibers, polyolefin fibers, polystyrene fibers, acrylic fibers, phenolformaldehyde resin fibers, aromatic and aliphatic polyamide fibers, polyacrylamide fibers, polyacrylimide fibers or mixtures thereof which may include bicomponent fibers.

Examples of substrates in accordance with the invention include, inter alia, glass, fiberglass, ceramics, graphite (carbon), PBI (polybenzimidazole), PTFE, polyaramides, such as KEVLAR™ and NOMEX™, metals including metal wire or mesh, polyolefins such as TYVEK™, polyesters such as DACRON™ or REEMAY™, polyamides, polyimides, thermoplastics such as KYNAR™ and TEFZEL™, polyether sulfones, polyether imide, polyether ketones, novoloid phenolic fibers such as KYNOL™, KoSa™ polyester fibers, JM-137 M glass fibers, Owens-Corning M glass, Owens-Corning K glass fibers, Owens-Corning H glass fibers, Evanite 413M glass microfibers, Evanite 719 glass microfibers, cellulosic fibers, cotton, asbestos and other natural as well as synthetic fibers. The substrate may comprise a yarn, filament, monofilament or other fibrous material either as such or assembled as a textile, or any woven, non-woven, knitted, matted, felted, etc. material. The polyolefin may be polyvinyl alcohol, polypropylene, polyethylene, polyvinyl chloride, polyurethane, etc. alone or in combination with one another. The acrylics may be DYNEL, ACRILAN and/or ORLON. RHOPLEX AC-22 and RHOPLEX AC-507 are acrylic resins sold by Rohm and Haas which nay also may be used. The cellulosic fibers may be natural cellulose such as wood pulp, newsprint, Kraft pulp and cotton and/or chemically processed cellulose such as rayon and/or lyocell.

Nonlimiting examples of non-woven materials that may be useful in the present invention include non-woven, continuous fiberglass veils, such as Firmat™ 100, Pearlveil™ 110, Pearlveil™ 210, Curveil™ 120, Curveil™ 220, Flexiveil™ 130, Flexiveil™ 230 and Pultrudable veil (all available from Schmelzer Industries, Inc., Somerset, Ohio). The woven materials may be Airlaid™, Spunbond™ and Needlepunch™ (available from BFG Industries, Inc. of Greensboro, N.C.). Nonlimiting examples of filament materials include D, E, B, C, DE, G, H, K filaments of various grades, including electrical grade, chemical grade and high strength grade (all available from BFG Industries, Inc. of Greensboro, N.C.).

In a preferred embodiment, the substrate is a woven fiberglass mat. As used herein, a fiberglass mat includes nonwoven and woven fiberglass mats. In a particularly preferred embodiment, the substrate of the present invention is a woven fiberglass mat such as style 1625, style 1610 and style 1614 of BGF Industries (Greensboro, N.C.).

The use of the structural materials of the present invention for manufacturing fabrics for use in articles such as mattresses, cribs, drapes and upholstered furniture, may enable the article to exceed current flammability standards for these types of articles. While flammability standards for mattresses have not specifically been set by the federal or state governments, some government agencies have provided recommended guidelines.

For example, the United States Department of Commerce National Institute of Standards and Technology (NIST) in Gaithersburg, Md. has published a paper relating to a methodology for assessing the flammability of mattresses. See T. J. Ohlemiller et al., *Flammability Assessment Methodology for Mattresses*, NISTIR 6497, June 2000. While no clear standard is given, it is recommended that a mattress be able to withstand the described test procedures. The NTIS has noted that beds pose a unique fire hazard problem. It provides a series of tests for determining the flammability of mattresses.

In addition, the State of California Department of Consumer Affairs Bureau of Home Furnishings and Thermal Insulation ("the Bureau") issued a Technical Bulletin in October 1992 which provides a flammability test procedure for mattresses. See State of California Department of Consumer Affairs Bureau of Home Furnishings and Thermal Insulation Technical Bulletin 129, October 1992, *Flammability Test Procedure for Mattresses for use in Public Buildings* (California TB129). The technical bulletin provides standard methods for fire testing of mattresses. The methods produce data describing the burning behavior from ignition of a mattress until all burning has ceased, or after a period of one hour has elapsed. The rate of heat release is measured by an oxygen consumption technique. The Bureau indicates that mattresses complying with the test method will be safer and hopes that manufacturers will attempt to manufacture mattresses which pass the recommended tests. The Bureau indicates that "a mattress fails to meet the requirements of the test if any of the following criteria are exceeded:" (1) a maximum rate of heat release of 100 kW or greater, (2) a total heat release of 25 MJ or greater in the first 10 minutes, and (3) weight loss of 3 pounds or greater within the first 10 minutes due to combustion. A mattress manufactured with the fire resistant fabric material of the present invention complies with or exceeds the test standards recommended by both the NIST and the California TB129.

As indicated above, the fire resistant fabric material of the present invention is useful in the manufacture of mattresses. In this embodiment of the invention, the fire resistant fabric material may be used to line a decorative mattress fabric to produce a fire resistant mattress fabric. Nonlimiting examples of mattress fabrics include ticking (known in the art as a strong, tightly woven fabric comprising cotton or linen and used especially to make mattresses and pillow coverings), or fabrics comprising fibers selected from the group consisting of cotton, polyester, rayon, polypropylene, and combinations thereof. The lining may be achieved by methods known in the art. For example, the fire resistant fabric material of the present invention may simply be placed under a mattress fabric. Or, the fire resistant mattress material may be bonded or adhered to the mattress fabric, for example using a flexible and preferably nonflammable glue or stitched with fire resistant thread i.e., similar to a lining. The fire resistant mattress fabric of the present invention may then be used by the skilled artisan to manufacture a mattress which has improved flammability characteristics.

The mattresses of the present invention which comprise the fire resistant fabric material may be comprised of several layers, including, but not limited to at least one first layer which comprises a fabric layer (such as the mattress fabrics discussed above), at least one layer which comprises the fire resistant fabric material of the present invention (which may, for example be a second layer or a third layer), at least one cushion layer, a polyurethane foam layer, a non-woven sheeting layer and a layer comprising springs. The layer comprising the fire resistant fabric material of the present invention, as indicated above, comprises a substrate and a coating. In one embodiment, the fire resistant fabric material is coated on one side and the side with the coating is facing the first layer. However, as indicated above, the fire resistant fabric material may be coated on both sides.

In a particular embodiment of the invention, the mattress comprises at least one first layer comprising a mattress fabric and at least one second layer adjacent to the first layer and comprising the fire resistant fabric material of the present invention. The fabric of the first layer may be the mattress fabric discussed above, such as ticking, or a fabric comprising fibers selected from the group consisting essentially of cotton, polyester, rayon, polypropylene, and combinations thereof.

Figure 3:
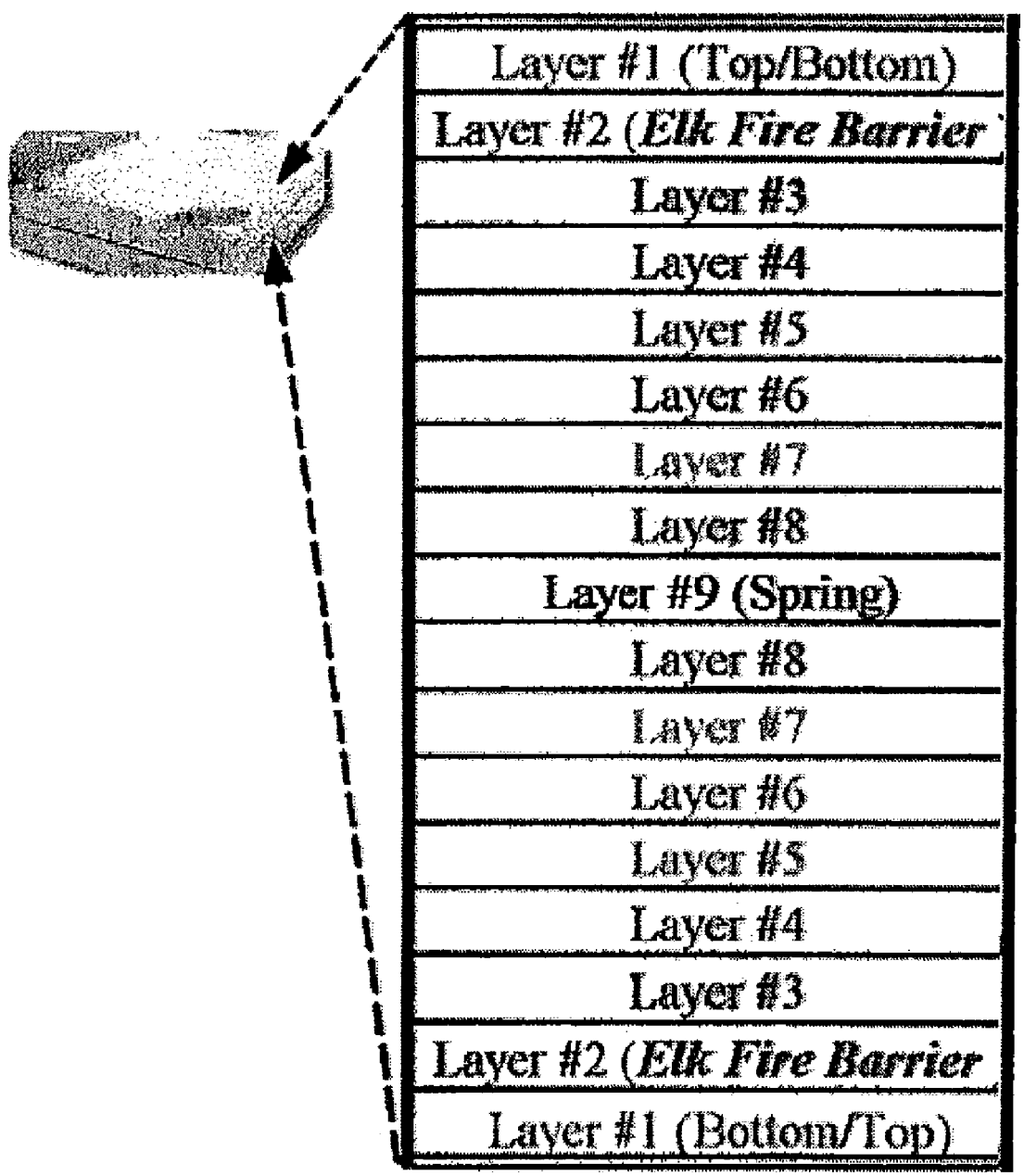
FIG. 3 is an illustration of an exemplary embodiment of a mattress made in accordance with the present invention.

The non-woven sheeting layer may be any suitable material known in the art. For example, the non-woven sheet layer may be made from any noncombustible fibers. In a preferred embodiment, the non-woven sheet layer is made from fiberglass fibers. The mattress of the present invention may further comprise at least one third layer adjacent to the second layer and at least one fourth layer adjacent to the third layer wherein each of the third and fourth layer is a cushion layer and at least one fifth layer adjacent to the fourth layer and which comprises polyurethane foam. The cushion layer may be made of polyester fibers or any fibers known in the art to be suitable for making a layer which provides cushioning, as long as the total weight of the ticking and the cushioning layer is less than 3 lbs. The polyurethane foam may be of varying thickness. Furthermore, the mattress of the present invention may comprise at least one sixth layer adjacent to the fifth layer and comprising the fire resistant fabric material. FIG. 3 shows an illustration of an exemplary mattress in accordance with the invention.

In one embodiment of the invention, the polyurethane foam may be the second layer of the mattress (i.e. under the ticking and in place of polyester fiber). The polyurethane foam layer provides a superior cushioning effect. However, the total weight of polyurethane foam layer and the ticking must be less than 3 lbs because the polyurethane foam and the ticking burn and the mattress will not pass burn tests if more than 3 lbs is lost. In such an embodiment, a preferred thickness for the foam is 0.25 inches.

The mattress of the present invention may further comprise a fire resistant border. In one embodiment, the border of the present invention comprises a first layer comprising a mattress fabric; and a second layer adjacent to the first layer and comprising the fire resistant fabric material of the present invention. In addition, the border may comprise a third layer adjacent to the second layer and which comprises a polyurethane foam. The border may also comprise a fourth layer, adjacent to the third layer, and which comprises a non-woven sheet. Alternatively, the border may comprise a fourth layer, adjacent to the third layer, and which comprises the fire resistant fabric material of the present invention and a fifth layer, adjacent to the fourth layer, and which comprises a non-woven sheet.

In another embodiment of the present invention, the mattress comprises at least one first layer comprising a mattress fabric at least one second layer, adjacent to the first layer, and which comprises the fire resistant fabric material of the present invention, at least one third layer adjacent to the second layer, and which comprises polyurethane foam, at least one fourth layer adjacent to the third layer, and which comprises a non woven sheet, at least one fifth layer adjacent to the fourth layer and which comprises a fibrous pad and at least one sixth layer adjacent to the fifth layer and which comprises another fibrous pad. All of the aforementioned embodiments of the mattress of the present invention pass all fire tests.

In a preferred embodiment, the mattress of the present invention comprises at least one first layer which comprises a mattress fabric, at least one second layer adjacent to the first layer wherein the second layer is a cushion layer, and at least one third layer adjacent to the second layer, and which comprises the fire resistant fabric material of the present invention. The mattress may further comprise at least one fourth layer adjacent to the third layer and wherein the fourth layer is a cushion layer, at least one fifth layer, adjacent to the fourth layer, and which comprises polyurethane foam, and at least one sixth layer, adjacent to the fifth layer, and which comprises a non-woven sheet. The cushion layer may be made from any fiber known in the art suitable for making a cushion. In a preferred embodiment, the cushion layer comprises polyester fibers. In a particularly preferred embodiment, from a comfort standpoint, but not a fire resistance standpoint, the second layer is a two ounce polyester fiber layer.

As indicated above for certain embodiments of the mattresses of the present invention, the coating of the fire resistant fabric material faces the first layer. As used herein, "faces the first layer" means that the fire resistant fabric material has a coating on one or both sides. If the coating is on one side, that side faces the first layer, with the uncoated side facing away from the first layer. In addition, the numbers of the layers indicates the order of the layers. For example, if the mattress fabric is the first layer, this layer is the top of the mattress, with the second layer being adjacent to the first layer, the third layer is adjacent to the second layer, and so on.

In addition to the layers described above, the mattresses of the present invention may comprise other layers which may comprise one or more fibrous pad layers and/or a spring layer. The mattresses may also comprise a border, such as the border described above. Further materials which may be incorporated into the mattress of the present invention include construction materials, such as non fire retardant or fire retardant thread for stitching the mattress materials together (e.g. glass thread or Kevlar thread) and non-fire retardant or fire retardant tape. Silicon oil may be used with Kevlar thread to diminish breakage and enhance production time. In a particularly preferred embodiment of the present invention, conventional tape and/or conventional thread may be used and the mattress still complies with the California TB129 test requirements.

The fire resistant materials of the present invention may be used to produce materials with similar characteristics to foam and cushion layers used in mattresses and may replace or be added in addition to such layers. In such an embodiment, the foam and cushioning layers made with the fire resistant materials of the present invention impart fire resistance to the mattress when used therein.

Table I below provides, in approximate percentages, the components of the coating the applicants have used in a exemplary embodiments of structural material of the present invention. Although the table shows possible combinations of binder, filler and surfactant, it is believed that other combinations may be employed.

TABLE I

| Coating Components | 1 | 2 | 3 | 4 | 5 | 6 | 7 | 8 |
|---|---|---|---|---|---|---|---|---|
| BINDER | | | | | | | | |
| Rovene 4402 | 36.25 | 26.73 | 18.71 | 18.71 | 18.71 | 18.71 | 36.25 | 36.25 |
| Rhoplex 3349 | 36.25 | 26.73 | 18.71 | 18.71 | 18.71 | 18.71 | 36.25 | 36.25 |
| SURFACTANT | | | | | | | | |
| Stanfax 320 | 4.5 | 3.32 | 2.30 | 2.30 | 2.30 | 2.30 | 2.30 | 2.30 |
| FILLER | | | | | | | | |
| Clay | | | 30.0 | | | | | |
| JTM Fly Ash | | | | | | | | |
| Calcium Carbonate | | | | | | 30.0 | | |
| Z-light Microspheres | | | | 30.0 | | | 7.5 | 3.75 |
| GEL CATALYST | | | | | | | | |
| SSF-GEL | 13.0 | 13.0 | 11.7 | 11.7 | 8.8 | 8.8 | 8.8 | 8.8 |

TABLE I-continued

| Coating Components | 1 | 2 | 3 | 4 | 5 | 6 | 7 | 8 |
|---|---|---|---|---|---|---|---|---|
| MISCELLANEOUS | | | | | | | | |
| TIO₂ | | | | | 30.0 | | | 7.5 |
| FR-15 | | 26.27 | 26.27 | 26.27 | 26.27 | 26.27 | 26.27 | 26.27 |
| DPG-38 | 5.0 | 3.69 | 3.5 | 3.5 | 3.5 | 3.5 | 3.5 | 3.5 |
| UP-750 | 5.0 | 3.69 | 3.5 | 3.5 | 3.5 | 3.5 | 3.5 | 3.5 |

The fire resistant fabric materials, as mentioned, include a substrate and a coating which comprises the structural material of the present invention. The coating (structural material) comprises approximately 34% by weight of the fire resistant fabric material. In the coating, about 10% to about 55% by weight is binder, about 2% to about 15% is surfactant, from about 5% to about 20% gel catalyst, and from about 0% to about 55% is filler. In a preferred embodiment, the coating comprises about 42% binder, about 5% surfactant, about 13% gel catalyst and about 30% filler. The filler is preferably about 30% clay. The substrate is preferably woven glass. The substrate may also be, for example, a woven fabric of DE, E, H, or G filament available from BFG Industries. The substrate is approximately 64% by weight of the fire resistant fabric material. The binder which bonds together the glass fibers is approximately about 25% to about 55% Rhoplex 3349 and/or Rovene 4402, or any other suitable binder. Nonlimiting examples of suitable binders is provided herein above.

The substrate may be coated by air spraying, dip coating, knife coating, roll coating or film application such as lamination/heat pressing. The coating may be bonded to the substrate by chemical bonding, mechanical bonding and/or thermal bonding. Mechanical bonding is achieved by force feeding the coating onto the substrate with a knife.

Structural materials and fire resistant fabric materials made in accordance with this invention may be of any shape. Preferably, such articles are planar in shape. The structural materials may be used in any of a variety of products, including, but not limited to mattress/crib fabrics, mattress/crib covers, upholstered articles, bedroom articles, (including children's bedroom articles), draperies, carpets, wall coverings (including wallpaper) tents, awnings, fire shelters, sleeping bags, ironing board covers, fire resistant gloves, furniture, airplane seats and carpets, fire-resistant clothing for race car drivers, fire fighters, jet fighter pilots, and the like, building materials, such as roofing shingles, structural laminate facing sheets, building air duct liners, roofing underlayment (or roofing felt), underlayment for organic, built up roofing materials, roll roofing, modified roll products, filter media (including automotive filters), automotive hood liners, head liners, fire walls, vapor barriers etc.

The structural fabric material may be used alone or may be used as a liner for a decorative fabric, such as the type used for mattresses, drapes, sleeping bags, tents etc. which may also be fire resistant.

In inventive fire resistant fabric materials, the substrate may be coated on one side or both sides depending on the intended application. For instance, if one side of the substrate is coated with the gel catalyst/surfactant/binder coating, the other surface can be coated with another material. In the roofing materials industry, for example, the other material may be conventional roofing asphalt, modified asphalts and non-asphaltic coatings, and the article can then be topped with roofing granules. It is believed that such roofing material could be lighter in weight, offer better fire resistance and better performance characteristics (such as cold weather flexibility, dimensional stability and strength) than prior art roofing materials.

The mixture comprising the binder, surfactant and filler may have a consistency of a light foam, such as shaving cream. It is believed that due to the low density of the mixture, the surfactant-generated microcells formed therein do not pass through the substrate when applied thereto. If desired, however, the viscosity of the coating may be increased through mixing to ensure that it does not bleed through the substrate. Nonlimiting examples of thickening agents include Acrysol ASE-95NP, Acrysol ASE-60, Acrysol ASE-1000, Rhoplex ASE-75, Rhoplex ASE-108NP, and Rhoplex E-1961, all available from Rohm & Haas.

Additionally, the fire resistant material may be coated with a water repellent material or the water repellent material may be added in the coating (i.e., internal water proofing). Two such water repellent materials are Aurapel™ 330R and Aurapel™ 391 available from Sybron/Tanatex of Norwich, Conn. In addition, Omnova Sequapel™ and Sequapel 417 (available from Omnovasolutions, Inc. of Chester, S.C.); BS-1306, BS-15 and BS-29A (available from Wacker of Adrian, Mich.); Syl-off™-7922, Syl-off™-1171A, Syl-off™-7910 and Dow Corning 346 Emulsion (available from Dow Corning, Corporation of Midland, Mich.); Freepel™-1225 (available from BFG Industries of Charlotte, N.C.); and Michem™ Emulsion-41740 and Michem™ Emulsion-03230 (available from Michelman, Inc. of Cincinnati, Ohio) may also be used. It is believed that wax emulsions, oil emulsions, silicone emulsions, polyolefin emulsions and sulfonyls as well as other similar performing products may also be suitable water repellent materials. These materials are also useful, as mentioned above, for imparting bounceback characteristics to the fire resistant material of the invention. Water repellents may be particularly preferred for example, in the manufacture of crib mattresses, for airplane seats and in the manufacture of furniture, particularly for industrial use.

A defoamer may also be added to the coating of the present invention to reduce and/or eliminate foaming during production. One such defoamer is Y-250 available from Drews Industrial Division of Boonton, N.J.

Fire retardant materials may also be added to the fire resistant materials of the present invention to further improve the fire resistance characteristics. Nonlimiting examples of fire retardant materials which may be used in accordance with the present invention include FRD-004 (decabromodiphenyloxide; Tiarco Chemicals, Dalton, Ga.), FRD-01, FR-10, FR-1, FR-12, FR-13, FR-14, FR-15 (all available from Tiarco Chemicals) zinc oxide, and aluminum trihydrate (ATH).

In addition, color pigments, including, but not limited to, T-113 (Abco, Inc.), W-4123 Blue Pigment, W2090 Orange Pigment, W7717 Black Pigment and W6013 Green Pigment, iron oxide red pigments (available from Engelhard of Louisville, Ky.) may also be added to the coating of the present invention to impart desired characteristics, such as a desired color.

The additional coatings of, e.g. water repellent material, antifungal material, antibacterial material, etc., may be applied to one or both sides of fire resistant materials and fire resistant fabric materials. For example, fire resistant fabric materials comprising substrates coated on one or both sides with filler/surfactant/binder coatings could be coated on one side with a water repellent composition and on the other side with an antibacterial agent. Alternatively, the water repellent material, antifungal material, antibacterial material, etc., may be added to the coating before it is used to coat the substrate.

EXAMPLE

Example 1

Fire Resistant Fabric Material

To produce the structural materials of the present invention, the applicant formulated the coating using just four major components, water, gel catalyst, surfactant and binder. In a further embodiment, filler was also added (see Table I above). The components were mixed in a reaction or mixing kettle for 30 minutes at a temperature of 65-95° F. The coating was used to coat a fiberglass mat on one and both sides. The mat was manufactured by BFG Industries, Inc. of Greensboro, N.C. and was style number 1625 and had a basis weight in the range of 1.8 lb./sq. to 1.9 lb./sq. The mat had a porosity in the range of 600 to 650 cfm/ft$^2$. The coated article was durable and flexible and did not crack on bending and possessed "bounceback" characteristics. Typical tensile strength measurements for uncoated versus coated were 47 lbs/3" and 171 lbs/3" respectively. Typical Elmendorff tear strength measurements were $\geq$3400 grams without the sample tearing.

The fire resistant fabric material was checked for combustibility. When exposed to the flame of a Bunsen burner from a distance of two inches, woven fabric and wet lay fabric failed the fire test (i.e. the glass fiber melted or a hole was created where the flame hit the fabric). However, when the fire resistant fabric material of the present invention was exposed to the flame of a Bunsen burner from a distance of two inches for a period of five minutes or more, no hole was created and the glass fibers did not melt. The coating protected the glass fabric from melting or disintegrating and the integrity of the glass fabric structure was maintained. In addition, when cotton was laid on top of the fire resistant fabric material such that the fire resistant fabric material was in between the Bunsen burner and the cotton, the cotton also was protected from the flame of the Bunsen burner.

The Technical Bulletin 129 of the State of California Department of Consumer Affairs Bureau of Home Furnishings and Thermal Insulation (October 1992) indicates that a fabric should maintain integrity when exposed to an open flame for 20 minutes and that test was passed in the lab with the fire resistant fabric material of the present invention and the mattresses of the present invention which comprise the fire resistant fabric material.

The invention provides a fire resistant fabric material which is flexible, pliable and has good drapability characteristics and which shows no signs of cracking, etc. The fabric material has a porosity of less than 18 cfm (uncoated has a porosity of 440 cfm) and may adhere very well to other materials, including decorative fabrics, polyurethane foam, isocyanurate foam, asphaltic compounds, and granules (non-asphaltic shingle components).

The fire resistant fabric material may have few pinholes or may have numerous pinholes and still maintain a porosity of less than from approximately 5 to approximately 50 cfm when coated with solvent based adhesive such as Firestone Bonding Adhesive BA-2004 which does not bleed through the coated product.

The components listed in Table I, with the exception of the gel catalyst, were mixed together and the mixture was added to a foamer. At a later time, through a port in the roamer, the gel catalyst was then added. The entire mixture which comprised the gel catalyst, was then spread onto a substrate.

The application of the coating to the substrate was accomplished by knife coating. In addition, the coating may also be performed by, frothing and knife coating, foaming and knife coating, foaming and knife coating and crushing, dip coating, roll coating (squeezing between two rolls having a gap that determines the thickness of the coating), by a hand-held coater which can be obtained from the Gardner Company, spraying, dipping and flow coating from aqueous or solvent dispersion, calendering, laminating and the like, followed by drying and baking, may be employed to coat the substrate as is well known in the art.

After coating, the samples were placed in an oven at approximately 325° F. for about 2.0 minutes to achieve gelling, drying and curing. Additionally, the coating may be separately formed as a film of one or more layers for subsequent combination with the substrate.

Although the present invention has been described with reference to certain preferred embodiments, various modifications, alterations, and substitutions will be apparent to those skilled in the art without departing from the spirit and scope of the invention, as defined by the appended claims. For example, other sources of filler as well as mixtures of acrylic latex and/or surfactants can be used in formulating the fire resistant fabric materials of the present invention. Moreover, the coating compositions can be applied to various types of substrates, as described above.

What is claimed is:

1. A fire resistant fabric material comprising a substrate coated with a structural material comprising a surfactant component, surfactant-generated microcells distributed substantially throughout said coating, a gel catalyst component and a binder component, wherein said fire resistant fabric material is drapable and said microcells are relatively uniform in size.

2. The fabric material according to claim 1 wherein said structural material further comprises a filler component.

3. The fabric material according to claim 2 wherein said substrate is planar and is coated on one side with said structural material.

4. The fabric material according to claim 2 wherein said substrate is planar and is coated on both sides with said structural material.

5. The fabric material according to claim 1 wherein said substrate is planar and is coated on one side with said structural material.

6. The fabric material according to claim 1 wherein said substrate is planar and is coated on both sides with said structural material.

7. The fabric material according to claims 1, 2, 5, 3, 6, or 4 wherein said fabric material further includes a water repellent material.

8. The fabric material according to claims 1, 2, 5, 3, 6, or 4 wherein said fabric material further includes an antifungal material.

9. The fabric material according to claims 1, 2, 5, 3, 6, or 4 wherein said fabric material further includes an antibacterial material.

10. The fabric material according to claims 1, 2, 5, 3, 6, or 4 wherein said fabric material further includes a surface friction agent.

11. The fabric material according to claims 1, 2, 5, 3, 6, or 4 wherein said fabric material further includes a flame retardant material.

12. The fabric material according to claims 1, 2, 5, 3, 6, or 4 wherein said fabric material further includes an algaecide.

13. The fabric material according to claims 1, 2, 5, 3, 6, or 4 wherein said fabric material is colored with dye.

* * * * *

UNITED STATES PATENT AND TRADEMARK OFFICE
CERTIFICATE OF CORRECTION

PATENT NO. : 7,521,385 B2  
APPLICATION NO. : 10/354219  
DATED : April 21, 2009  
INVENTOR(S) : Younger Ahluwalia Page 1 of 1

It is certified that error appears in the above-identified patent and that said Letters Patent is hereby corrected as shown below:

ON THE TITLE PAGE ITEM 73 insert:

-- Assignee: Building Materials Investment Corporation, Wilmington, DE (US) --

Signed and Sealed this

Twenty-third Day of June, 2009

JOHN DOLL  
*Acting Director of the United States Patent and Trademark Office*